Patented Oct. 11, 1927.

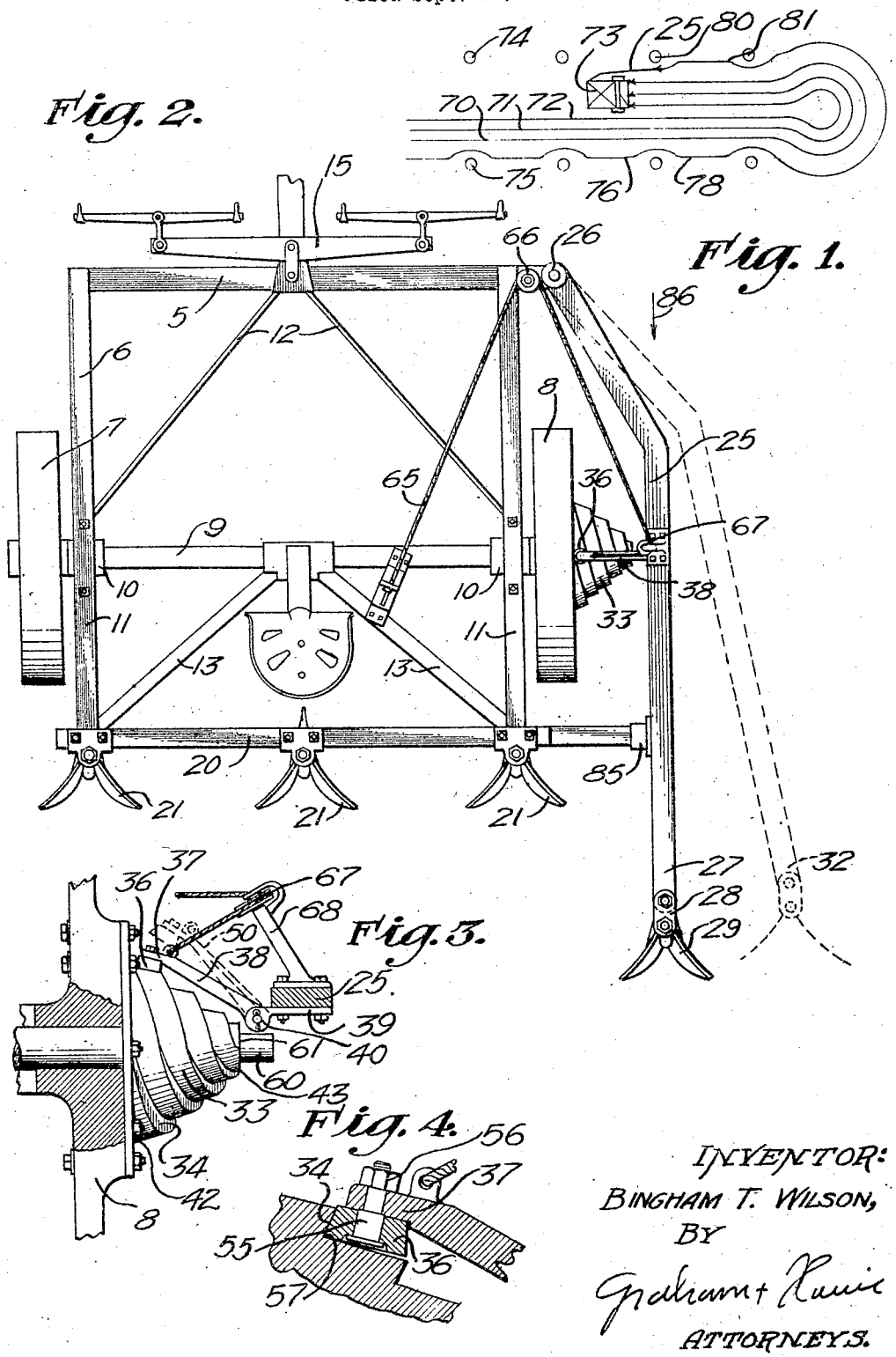

1,644,970

UNITED STATES PATENT OFFICE.

BINGHAM T. WILSON, OF LOS ANGELES, CALIFORNIA, ASSIGNOR TO WILSON FARM TOOL CORPORATION, A CORPORATION OF NEVADA.

SWINGING PLOW.

Application filed September 13, 1922. Serial No. 588,783.

My invention relates to agricultural implements and is more particularly an improved furrowing plow such as employed for forming furrows between the rows of trees in an orchard, in which to run water for irrigation purposes.

The general form of furrowing plow consists of a vehicle which may be drawn by farm animals, or tractor, having a number of furrowing plow blades attached at the back thereof which form furrows between the trees when the vehicle is drawn along between the separate rows. Although a device of this nature may be operated with considerable saving of time and labor as compared to the forming of furrows by manual labor or by the use of single furrow plows, a disadvantage still exists which consists of the inability to form furrows in the spaces between the consecutive trees of each row.

The failure to form furrows between the rows, as before noted, results in an uneven distribution of irrigation water and the leaving of dry spots between the trees.

It is an object of my invention to provide a furrowing plow having a furrowing blade so mounted thereupon that it may be swung into the spaces existing between the trees of an orchard, thus forming a furrow which will distribute water to these spots which are ordinarily deprived of proper irrigation.

It is a further object of the invention to provide a device of this character in which the movable furrow blade is supported at the rear end of an arm having its forward end pivoted to the forward end of the vehicle, and having a simple means for swinging the arm away from the vehicle so as to accomplish the guiding of the movable plow blade in between the trees of the orchard.

The especial advantages of my invention, and further objects thereof, will be made evident hereinafter.

Referring to the drawing which is for illustrative purposes only:

Fig. 1 is a diagrammatic view illustrating the utility of my invention.

Fig. 2 is a plan view of a swinging plow embodying the features of my invention.

Fig. 3 is an enlarged section showing the means I employ for swinging the arm away from the vehicle so as to accomplish the forming of a furrow between the trees.

Fig. 4 is an enlarged section showing the swinging end of the engagement arm and the manner in which the engagement roller is mounted thereupon.

As shown particularly in Fig. 2, I employ a vehicle 5 constructed of metal frame members 6 and having a pair of wheels 7 and 8 rotatably mounted upon an axle 9 which is rigidly secured by blocks 10 to the side members 11 of the vehicle 5. Truss rods 12 and diagonal members 13 are employed for reinforcing the frame 5. The vehicle may be adapted to be drawn either by tractor or by farm animals; the form shown in the drawing, being of light construction, is provided with a double tree 15 so that it may be drawn by animal power.

To the rear bar 20 of the frame 5, a number of furrowing plow blades 21 are secured, and to the forward end of the frame, a swingable arm 25 is pivoted at 26. The arm 25 extends to a point somewhat to the rear of the cross bar 20 and has swiveled to the rear end 27 thereof, by means of a fitting 28, an additional furrowing plow blade 29 which is intended for forming furrows between the consecutive trees in the orchard to be irrigated. As a means for swinging the arm 25 outwardly, as indicated by the dotted lines 32, I mount concentrically upon the outside of the wheel 8 a conical member 33, which has spiral paths 34 formed upon the outer surface thereof which are adapted to be engaged by a roller 36 mounted at the outer end 37 of an arm 38 which is secured to the bar 25 by means of a plate 39, and so hinged at 40 thereto that it may swing through a vertical plane. The spiral paths 34 advance outwardly from the base 42 of the cone to the apex 43 in one revolution of the wheel 8. In order that the arm 25 may be swung from the retracted position shown in Fig. 2 to the extended position shown at 32 during the travel of the vehicle a distance equal to the circumference of the wheel 8, there are a multiplicity of the spirals 34 formed upon the cone 33, in order that the roller 36 will be immediately engaged and the arm 25 moved outwardly when the engagement arm 38 is allowed to drop from the position shown in dotted lines 50 in Fig. 3 to the position shown in full lines in that figure.

If only a single spiral were provided, the engagement arm 38 might be dropped at a time immediately after the entering end of the spiral had just passed the central point; which would mean that the vehicle would move forward a distance equal to a full revolution of the wheel 8, before starting the outward movement of the arm 25. Therefore, by providing a number of the spirals, an almost immediate extension of the arm 25 is assured.

The roller 36 is slightly conical in form and is mounted upon a pin 55 which threads through the end 37 of the engagement arm 38 and has a lock nut 56 threaded thereupon to clamp the pin 55 securely in place. In Fig. 4 it will be perceived that the engagement faces 57 of the spirals 34 are given a slope which extends over the circumferential face of the roller 36 and has a tendency to maintain the roller in engagement with the spiral. Upon reaching the apex 43 of the spiral, the roller drops down upon the projection 60 and rolls against the shoulder 61, thus causing the arm 25 to be maintained in extended position until the engagement arm 38 is lifted by pulling on the cable 65 which extends over a pulley 66 mounted at the forward end of the vehicle and over a pulley 67 supported by a bracket 68 at a point upon the arm 25 opposite to the engagement arm 38.

As shown in the diagrammatic view of Fig. 1, the lines numbered 70, 71 and 72 represent furrows cut by the blades 21 as the vehicle indicated diagrammatically at 73 is drawn between the rows of trees 74 and 75. The numeral 76 indicates a furrow formed by the blade 29. This furrow extends in between the trees as indicated at 78 and thus provides a means for directing the flow of water into those spaces between the trees which are ordinarily neglected. The diagrammatically shown vehicle 73 has the arm 25 thereof retracted in the process of going around the tree 80. The extension of the arm is accomplished by the mechanism previously described. In passing down the aisles between the rows of trees the operator may cause the blade 29 to form such a furrow, as shown at 76, by alternately lifting and dropping the engagement arm 38 so as to accomplish a swinging of the arm from the normal position which it assumes against the stop 85 when the extension elements are disengaged to the extended position in which the forming of the deflected portions 81 of the furrow 76 are formed. The arm 25 is held forcibly against the stop 85 due to the swinging moment which is imparted thereto owing to the pivot 26 being offset inwardly from the direct line of travel of the arm 25 indicated by the arrow 86. The magnitude of this moment may be changed to suit working conditions by moving the point of pivot either inwardly or outwardly.

I claim as my invention:

1. In a device of the class described, the combination of: a vehicle; an arm pivoted to said vehicle; and cam and follower means operating between said vehicle and said arm and comprising a spiral secured to a ground wheel for swinging said arm upon said pivot.

2. In a device of the class described, the combination of: a vehicle; an arm pivoted to said vehicle; and means operating between said vehicle and said arm for swinging said arm on said pivot, said means consisting of a rotatable member presenting spiral paths, and engaging means on said arm adapted to engage said spiral paths.

3. In a device of the class described, the combination of: a vehicle; an arm pivoted to said vehicle; and means operating between said vehicle and said arm for swinging said arm on said pivot, said means for swinging said arm consisting of a member, axially mounted upon one of the wheels of said vehicle, having spiral threads formed thereupon, and engaging means, secured to said arm, adapted to engage said spiral threads.

4. In a device of the class described, the combination of: a vehicle; an arm pivoted to said vehicle; and means operating between said vehicle and said arm for swinging said arm on said pivot, said means for swinging said arm consisting of a member, axially mounted upon the outside of one of the wheels of said vehicle, having spiral threads formed thereupon, which progress outwardly in a direction opposite to the direction of forward rotation of said wheel, and engaging means secured to said arm, adapted to engage said spiral threads.

5. In a device of the class described, the combination of: a vehicle; a plow blade supporting member; and cam and follower means comprising a spiral rotated by a ground wheel for moving said member laterally outward from said vehicle as said vehicle moves forwardly.

In testimony whereof, I have hereunto set my hand at Los Angeles, California, this 11th day of September, 1922.

BINGHAM T. WILSON.